(12) United States Patent
Kim et al.

(10) Patent No.: US 8,879,021 B2
(45) Date of Patent: Nov. 4, 2014

(54) LIQUID CRYSTAL DISPLAY DEVICE

(75) Inventors: Min Jae Kim, Jeonju-si (KR); Yeong Ho Kim, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/339,187

(22) Filed: Dec. 28, 2011

(65) Prior Publication Data

US 2012/0327328 A1 Dec. 27, 2012

(30) Foreign Application Priority Data

Jun. 24, 2011 (KR) ........................ 10-2011-0061965

(51) Int. Cl.
*G02F 1/1333* (2006.01)
*G02F 1/1345* (2006.01)
*H05K 7/18* (2006.01)
*H05K 9/00* (2006.01)

(52) U.S. Cl.
CPC .................... *G02F 1/133308* (2013.01); *G02F 2001/133334* (2013.01)
USPC ............... 349/59; 349/58; 349/149; 349/150; 361/800; 361/818

(58) Field of Classification Search
CPC .......................................... G02F 2001/133334
USPC ............... 349/149–150, 58–59; 361/800, 818
See application file for complete search history.

(56) References Cited

U.S. PATENT DOCUMENTS

| | | | |
|---|---|---|---|
| 6,411,353 B1 * | 6/2002 | Yarita et al. | 349/59 |
| 2005/0094053 A1 * | 5/2005 | Byun | 349/58 |
| 2006/0262241 A1 * | 11/2006 | Jeong | 349/58 |
| 2008/0079864 A1 * | 4/2008 | Nishimura | 349/58 |
| 2009/0195996 A1 * | 8/2009 | Isono | 361/751 |
| 2012/0262898 A1 * | 10/2012 | Yamada | 361/818 |

* cited by examiner

*Primary Examiner* — Nathanael R Briggs
(74) *Attorney, Agent, or Firm* — Birch, Stewart, Kolasch & Birch, LLP

(57) ABSTRACT

An LCD device adapted to become thinner and simultaneously prevent a defect (or fault) due to static electricity is discussed. The LCD device according to an embodiment includes a liquid crystal display panel, an upper case formed from an insulation material and configured to encompass edges of the liquid crystal display panel, a driver PCB (printed circuit board) configured to apply drive signals to one edge of the liquid crystal display panel, a light source configured to apply light to the liquid crystal display panel, a bottom cover formed from a metal material and configured to receive the light source, and a shielding film disposed under one edge of the upper case opposite to the driver PCB and electrically connected to the bottom cover.

17 Claims, 6 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2011-0061965, filed on Jun. 24, 2011, which is hereby incorporated by reference in its entirety.

BACKGROUND

1. Field of the Disclosure

This disclosure relates to a liquid crystal display (LCD) device, and more particularly to an LCD device adapted to become thinner and prevent a fault due to static electricity.

2. Description of the Related Art

Cathode ray tubes (CRTs) correspond to one of many display devices which are widely used. The CRTs are mainly used as monitors for TVs, measuring apparatuses, information terminals, and so on. However, the heavy weight and large size of the CRTs have been a major hindrance to the manufacturing of small, light electronic products.

To address this matter, LCD devices are gradually being used in a wide range of applications due to their advantages such as light weight, thinness, low power consumption, and others. Furthermore, the LCD devices are being manufactured to have even larger screens, be thinner, and consume less power, in order to meet requirements of users.

Such LCD devices display images by controlling the amount of light transmitted through liquid crystal. However, the LCD devices are not self-illuminating display devices, unlike CRTs. As such, the LCD devices each include a backlight unit configured to have a separate light source, which provides light necessary to display an image, and disposed on the rear surface of an LCD panel.

In order to provide an ordinarily completed LCD device, a top case configured to encompass upper edges of a LCD panel and formed of a metal material is first combined with a bottom cover configured to receive components of a backlight unit. Then, an upper system case is assembled with a lower system case in such a manner as to encompass the top case and the bottom cover.

The ordinary completed LCD device further includes a system driver disposed in the inner side of the lower system case. The system driver is configured to apply system drive signals to a panel driver which is used for driving the LCD panel.

Static electricity due to movement, friction and other causes can flow into the LCD device with the above-mentioned configuration. The static electricity corresponds to charged electrical charges by friction, peeling-off or others. Such static electricity can transition into a lower energy status by diverging electrical energies through a discharging operation.

When the static electricity is discharged, a discharging voltage with a very high level can be induced. As such, electrical appliances including the ordinary LCD device can be damaged. If static electricity flows from the outer side into the inner side of the LCD device, it can be discharged by the top case and the bottom cover without being transferred to the inner side of the LCD device.

However, the ordinary LCD device must be configured with the top case, the bottom cover, and the upper and lower system cases in order to encompass the LCD panel and the components of the backlight unit. As such, the configuration of the ordinary LCD device is very complex. Therefore, it is very difficult to reduce the manufacturing cost and time of the ordinary LCD device.

As the LCD devices gradually become thinner, it is desired for the LCD device to have a more simplified configuration. Moreover, the LCD device that prevents damage caused by static electricity is being researched.

BRIEF SUMMARY

Accordingly, the present embodiments are directed to an LCD device that substantially obviates one or more of problems due to the limitations and disadvantages of the related art, and backlight unit and LCD device including the same.

An object of the present embodiments is to provide an LCD device which is adapted to become thinner and simultaneously prevent a fault due to static electricity.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal display panel; an upper case formed from an insulation material and configured to encompass edges of the liquid crystal display panel; a driver PCB (printed circuit board) configured to apply drive signals to one edge of the liquid crystal display panel; a light source configured to apply light to the liquid crystal display panel; a bottom cover formed from a metal material and configured to receive the light source; and a shielding film disposed under one edge of the upper case opposite to the driver PCB and electrically connected to the bottom cover.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
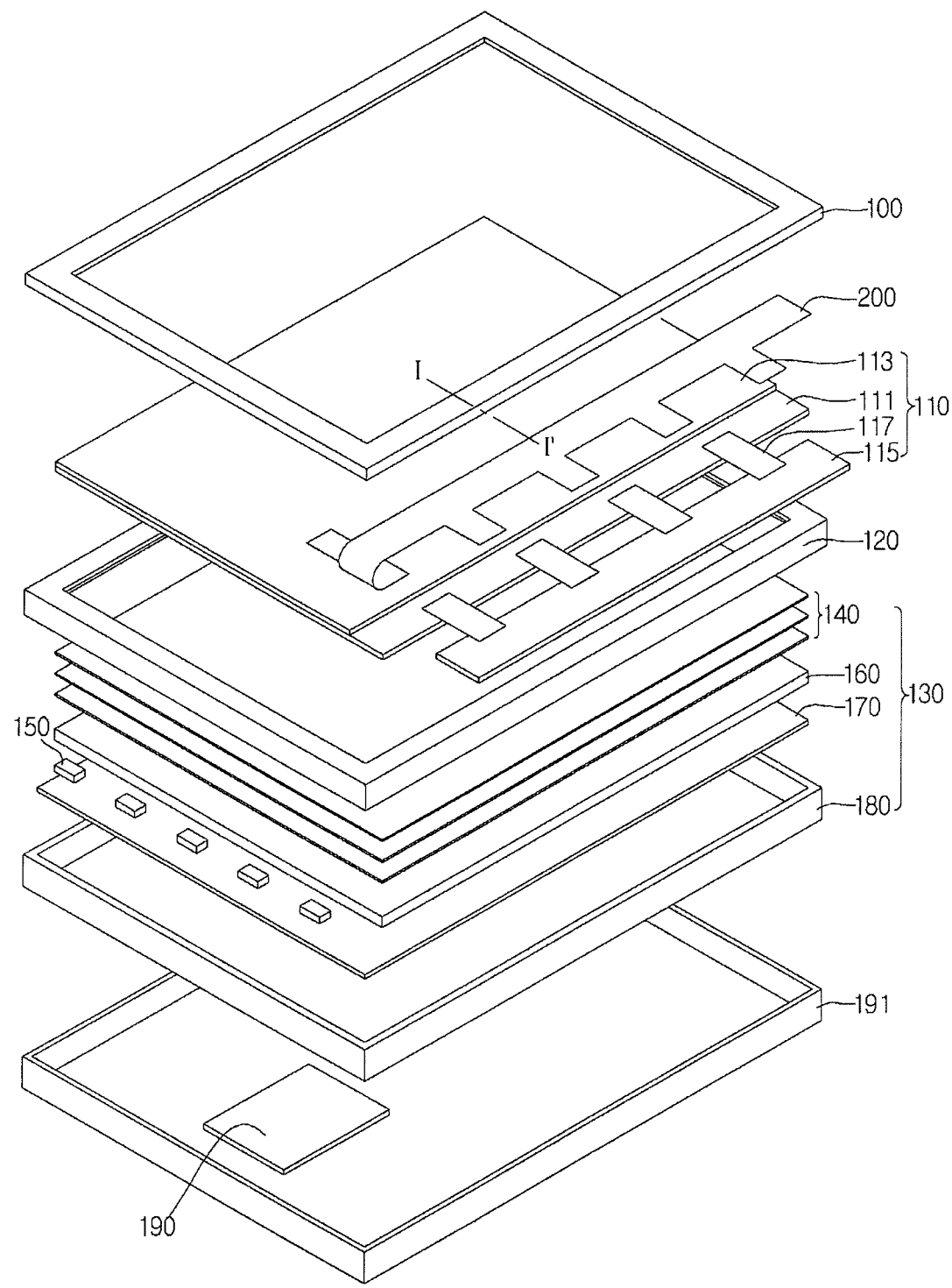
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
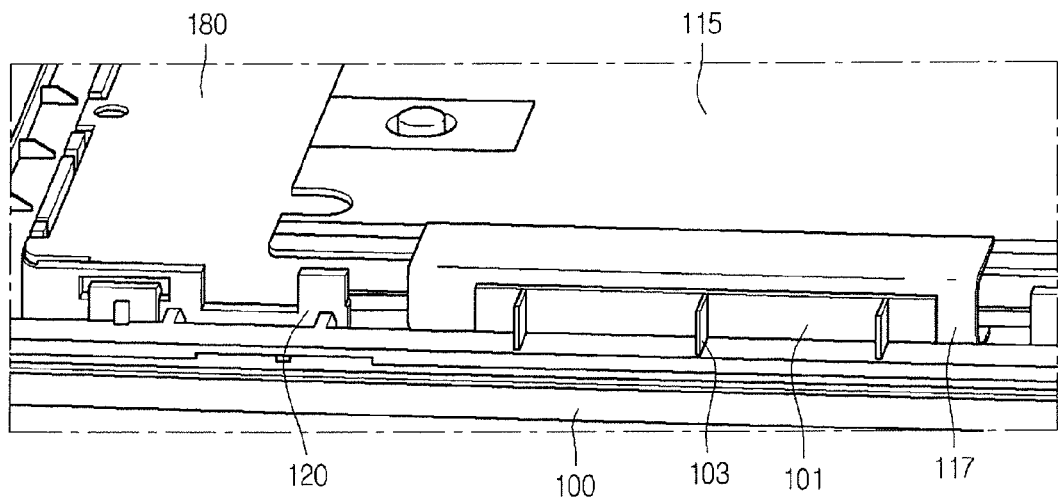
FIG. 2 is a perspective view showing an LCD device according to an embodiment of the present disclosure taken in a lower direction.
Figure 3:
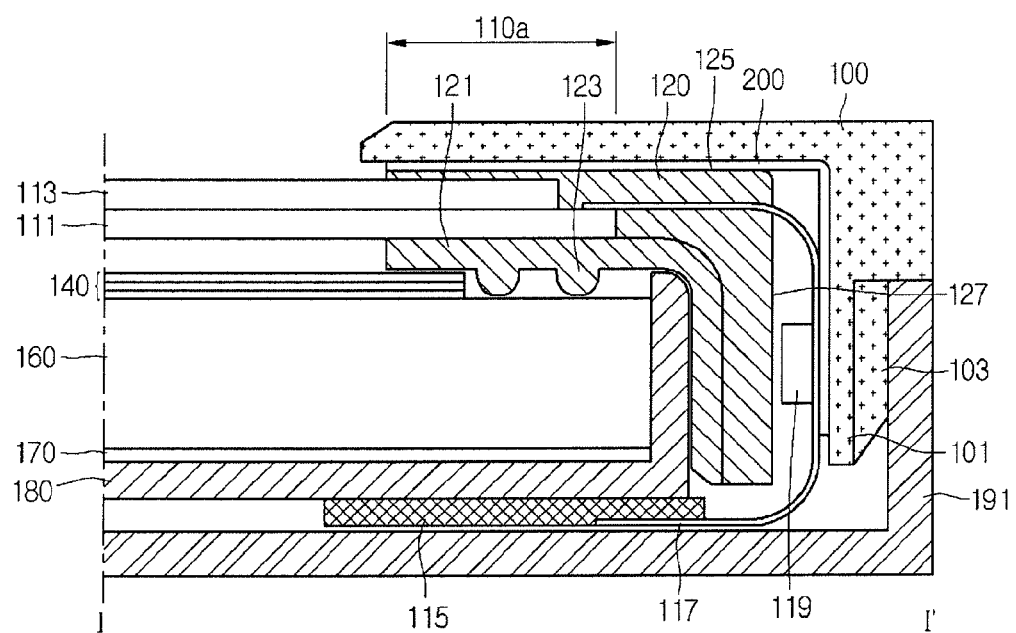
FIG. 3 is a cross-sectional view showing the LCD device taken along a line I-I' in FIG. 1.

FIG. 1 is a disassembled perspective view showing an LCD device according to an embodiment of the present disclosure. FIG. 2 is a perspective view showing an LCD device according to an embodiment of the present disclosure taken in a lower direction. FIG. 3 is a cross-sectional view showing the LCD device taken along a line I-I' in FIG. 1.

Referring to FIGS. 1 through 3, the LCD device according to an embodiment of the present disclosure includes an LCD panel 110 configured to display images, a backlight unit 130 disposed under the LCD panel 110 and configured to apply light to the LCD panel 110, and a panel guider 120 configured to support the LCD panel 110 and combined with the backlight unit 130. The LCD device further includes an upper case 100 configured to encompass upper edges of the LCD panel 110, a system driver 190 disposed under the backlight unit 130, and a lower case 191 combined with the upper case 100. The system driver 190 is configured to apply drive signals to the LCD panel 110 and the backlight unit 130.

The upper case 100 functions to protect the LCD panel 110. The upper case 100 can be formed from an insulation material adapted to enhance quality in the external figure of the LCD device and reduce manufacturing cost of the LCD device.

The LCD panel 110 includes a thin film transistor substrate 111 and a color filter substrate 113 disposed opposite each other and combined to maintain a uniform cell gap between them, as well as a liquid crystal layer (not shown) interposed between the two substrates.

Although they are not shown in detail in the drawings, the thin film transistor substrate 111 and the color filter substrate 113 will now be described in detail. The thin film transistor substrate 111 includes a plurality of gate lines and a plurality of data lines formed to cross each other, and a plurality of thin film transistors TFTs formed at the intersections of the plurality of gate lines and the plurality of data lines. The plurality of gate lines and the plurality of data lines crossing each other define the pixels. The thin film transistors TFTs are connected to pixel electrodes each included in the pixels, respectively. On the other hand, the color filter substrate 113 includes: red, green, and blue color filters opposite to the pixels; and a black matrix rimming each of the color filters and configured to shield the gate lines, the data lines, and the thin film transistors.

Also, the LCD device according to an embodiment of the present disclosure includes a driver PCB (Printed circuit board) 115 disposed one edge of the LCD panel 110 and configured to apply drive signals to the gate lines and the data lines. The driver PCB 115 is electrically connected with the LCD panel 110 by means of COFs (Chips on films) 117. This COF 117 can be replaced with a TCP (Tape Carrier Package). Each of the COFs 117 includes a driver IC (Integrated circuit) chip 119 loaded thereon.

Such a driver PCB 115 can be disposed under the backlight unit 130 in such a manner as to be connected to the LCD panel 110 by means of the COFs 117 formed from a flexible material. To this end, the COF 117 is bent from an edge of the LCD panel 110 toward a lower direction of the backlight unit 130. In other words, one surface of the COF 117 loaded with the driver IC chip 119 is opposite one outer side surface of the LCD panel 110 and the other surface of the COF 117 is opposite one inner side surface of the upper case 100.

The backlight unit 120 disposed under the LCD panel 110 includes a bottom cover 180 with an opened upper surface, a plurality of light sources 150 arranged in at least one inner edge of the bottom cover 180, and a light guide plate 160 disposed parallel to the light sources 150 and configured to convert spotted incident lights into two-dimensional light. The backlight unit 120 further includes a reflection sheet 170 disposed under the light guide plate 160 and configured to reflect light progressing downwardly from the light guide plate 160 toward the LCD panel 110, and optical sheets 140 disposed over the light guide plate 160 and configured to scatter and converge incident light from the light guide plate 160.

Moreover, the LCD device according to an embodiment of the present disclosure includes a shielding film 200 configured to prevent circuit damage of the driver PCB 115 due to an inflow of static electricity via the COFs 117. The shielding film 200 also has a function of preventing a damage of the driver IC chip 119 which can be caused by the inflow of static electricity through the COF 117.

The shielding film 200 is disposed at one edge of the panel guider 120 opposite to an area in which the driver PCB 115 is installed. This shielding film 200 is formed in a structure encompassing one upper surface edge 125 and one outer side surface 127 of the panel guider 120. In other words, the shielding film 200 can overlap with one upper surface edge 125 and one outer side surface 127 of the panel guider 120 as well as one edge 110a of the LCD panel 110. Actually, the shielding film 200 can contact one upper surface edge 125 and one outer side surface 127 of the panel guider 120 as well as one edge 110a of the LCD panel 110. Also, the shielding film 200 is electrically connected to the bottom cover 180 formed from a metal material. Furthermore, the shielding film 200 has a structure configured to encompass the outer surfaces of the COFs 117.

In accordance therewith, the shielding film 200 prevents damage to the driver PCB 115 and driver IC chips 119 from externally induced static electricity. More specifically, the shielding film 200 bypasses the externally induced static electricity to the bottom cover 180 and enables the static electricity to be discharged to a ground source which is electrically connected to the bottom cover 180 via the system driver 190 disposed at the rear surface of the bottom cover 180. Therefore, damage to the driver PCB 115 and driver IC chips 119 can be prevented.

Alternatively, the shielding film 200 can be formed in a bent shape which is bent opposite to the COFs 117 between the panel guider 120 and the upper case 100.

The panel guider 120 includes a support surface portion 121 configured to support the LCD panel 110, and a plurality of protrusions 123 formed to protrude from the support surface portion 121 in a downward direction. The plurality of protrusions 123 are used to prevent a movement of the light guide plate 160.

The upper case 100 formed from an insulation material functions to protect the LCD panel 110. The upper case 100 includes a guide portion 101 configured to bring the shielding film 200 and the COFs 117 in contact with each other. Such an upper case 100 can be formed from a plastic material.

The guide portion 101 is formed in a structure of protruding from one side of the upper case 100 in a downward direction. Also, the guide portion 101 is formed in a planar shape being opposite the other surfaces (or the rear surface) of the COFs 117.

Such a guide portion 101 can maximize a heat radiating effect of the driver IC chips 119 by guiding the shielding film 200 brought into contact with the COFs 117.

Moreover, the guide portion 101 comes in contact with the outer surface of the shielding film 200. As such, the guide portion 101 can prevent a contact fault between the shielding film 200 and the COFs 117 which can be caused by a slight movement of the LCD panel 110 and/or the driver PCB 115 when the LCD device is moved or driven.

The upper case 100 further includes a plurality of support members 103 arranged on the outer surface of the guide portion 101. The plurality of support members 103 are used for reinforcing a strength of the guide portion 101. The guide portion 101 and the plurality of support members 103 can be simultaneously formed in a single body when the upper case 100 is manufactured.

The shielding film 200 included in the LCD device according to an embodiment of the present disclosure will now be explained in detail referring to FIGS. 4 and 5.

Figure 4:
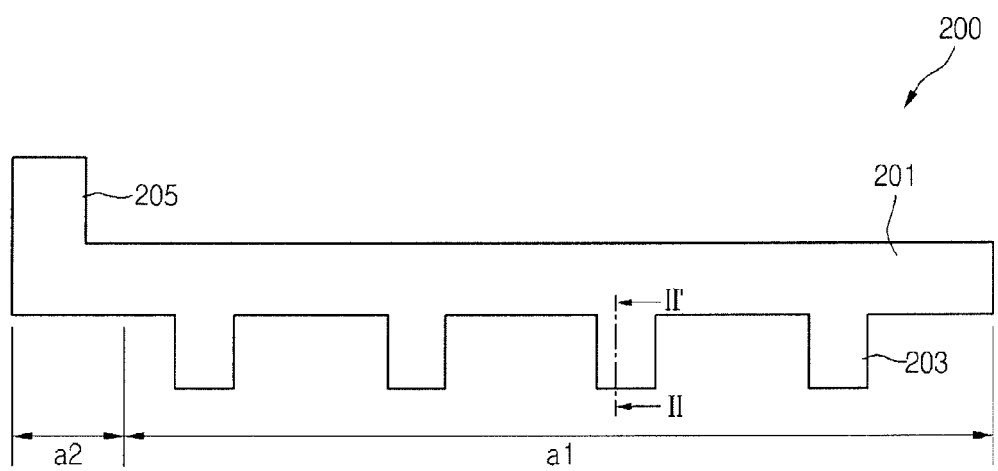
FIG. 4 is a perspective view showing the shielding film of FIG. 1.

FIG. 4 is a perspective view showing the shielding film of FIG. 1. FIG. 5 is a cross-sectional view showing the shielding film taken along a line II-II' in FIG. 4.

Figure 5:
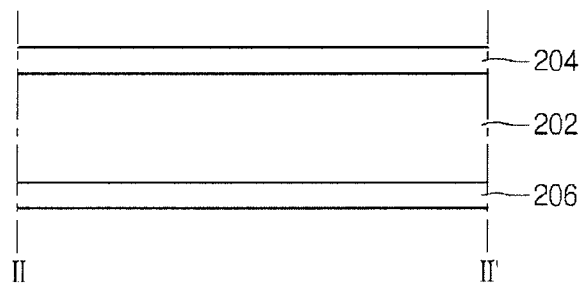
FIG. 5 is a cross-sectional view showing the shielding film taken along a line II-II' in FIG. 4.

As shown in FIGS. 3 through 5, the shielding film 200 is defined into a first area a1 opposite to one upper surface edge 125 of the panel guider 120 and the COFs 117, and a second area a2 used for a connection with the bottom cover 180. The first area a1 is used for prevent a direct inflow of external static electricity.

The shielding film 200 includes a body portion 201 and a plurality of wings 203. The body portion 201 is configured to include long edges opposite to each other and short edges opposite to each other. The plurality of wings 203 are formed to protrude outwardly from one long edge of the body portion 201 and come into contact with the other surfaces (or the outer surfaces) of the COFs 117, respectively. The body portion 201 and the plurality of wings 203 are arranged in the first area a1.

The plurality of wings 203 comes into contact with the other surfaces (or the outer surfaces) of the COFs 117 without being loaded the driver IC chips 119 and is used for transferring heats generated in the driver IC chips 119 to the bottom cover 180. In other words, the plurality of wings 203 has a function of discharging heat from the driver IC chips 119.

The LCD device according to an embodiment of the present disclosure can be applied to a large-sized LCD device model with a larger driver IC chip load compared to that of an ordinary LCD device model, because the number of driver IC chips must be reduced. To this end, the LCD device according to an embodiment of the present disclosure enables the shielding film 200 to include the plurality of wings used for discharging heat generated in the driver IC chips 119.

The shielding film 200 further includes a connection portion 205 formed to extend from one end of the body portion 201 and used for coming into contact with the bottom cover 180. This connection portion is positioned in the second area a2.

The shielding film 200 can have a structure including a base layer 202 formed from an insulation material and a thin metal layer 204 formed on one surface of the base layer 202. The base layer 202 can be formed from PET (polyethylene terephthalate) adapted to be easily manufactured and reduce manufacturing cost. The thin metal layer 204 can be formed from aluminum Al.

In the LCD device according to an embodiment of the present disclosure, the base layer 202 is formed to have a thicker thickness than that of the thin metal layer 204. This prevents the thin metal layer 204 of a thin film type from rolling in the longitude and short edge directions.

The shielding film 200 further includes an adhesive layer 206 formed on the other surface of the base layer 202 corresponding to the plurality of wings 203. The adhesive layer 206 is used for fixing (or fastening) each of the wings 203 to the other surface (or the outer surface) of the respective COF 117.

The LCD device according to an embodiment of the present disclosure forces the thin metal layer 204 to be opposite to the inner surface of the upper case 100 and the inner surface of the guide portion 101. Similarly to the COFs 117, the connection portion 205 bends along the outer surfaces of the panel guider 120 and enables the thin metal layer 204 to be in contact with the bottom cover 180. As such, the shielding film 200 included in the LCD device according to an embodiment of the present disclosure can be electrically connected to the bottom cover 180 by means of the connection portion 205.

In this manner, the LCD device according to an embodiment of the present disclosure can remove the top case included in the ordinary LCD device. Also, the LCD device includes the shielding film configured to encompass one upper surface edge 125 of the panel guider 120 opposite to the driver PCB 115 and one outer side surface of the panel guider 120, and discharges external static electricity toward the ground source through the bottom cover 180 and the system driver 190. As such, the LCD device can become thinner by removing the top case and simultaneously prevent the damage made possible by static electricity. Moreover, the manufacturing cost and entire weight of the LCD device can be reduced.

Furthermore, the LCD device according to an embodiment of the present disclosure includes the plurality of wings 203 united with the shielding film 200 in a single body and configured to be into direct contact with the other surfaces (the outer surface) of the COFs 117. In accordance therewith, the LCD device can prevent damage to the driver IC chips 119 which can be caused by heat.

Figure 6:
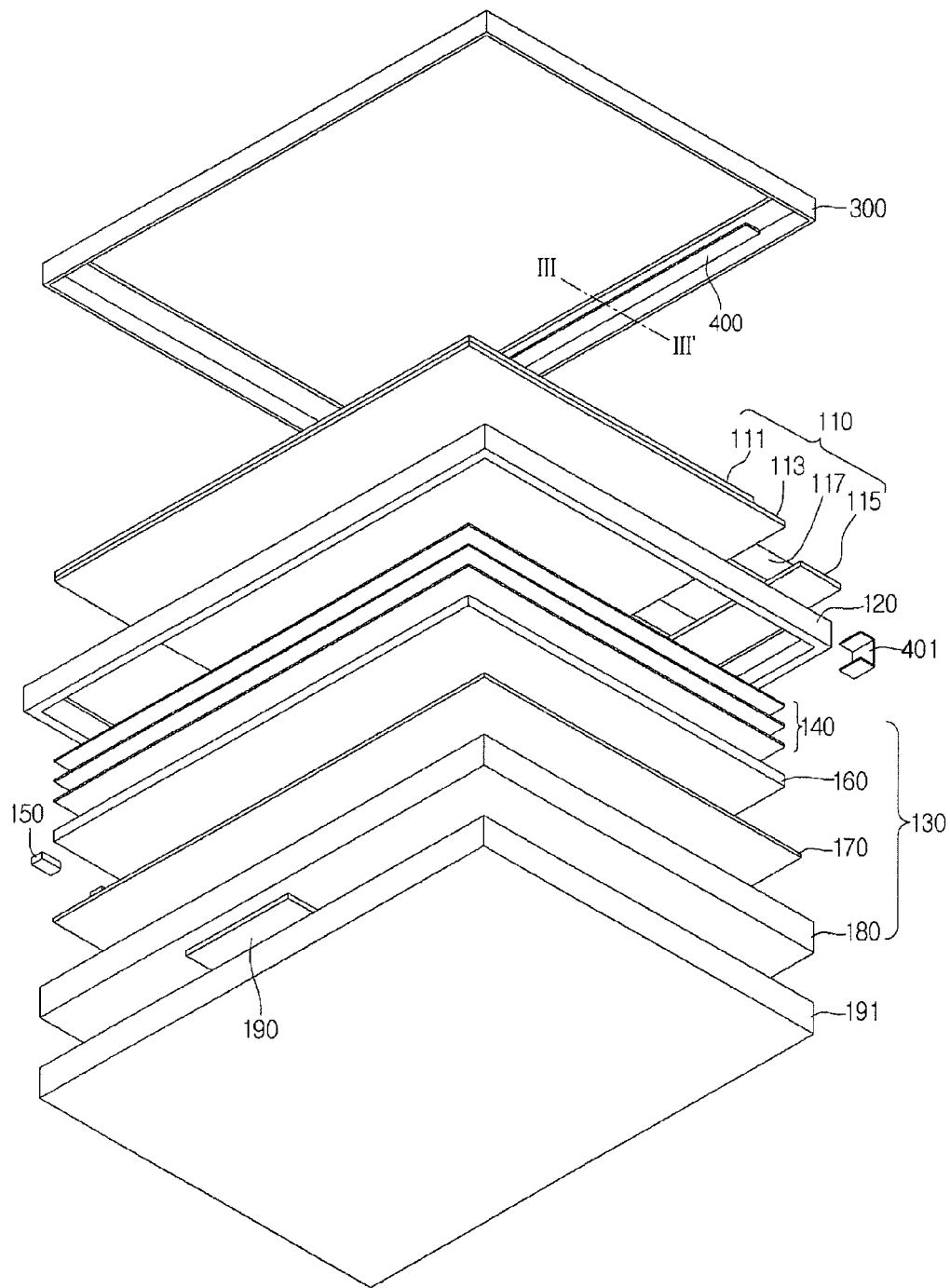
FIG. 6 is a disassembled perspective view showing an LCD device according to another embodiment of the present disclosure.
Figure 7:
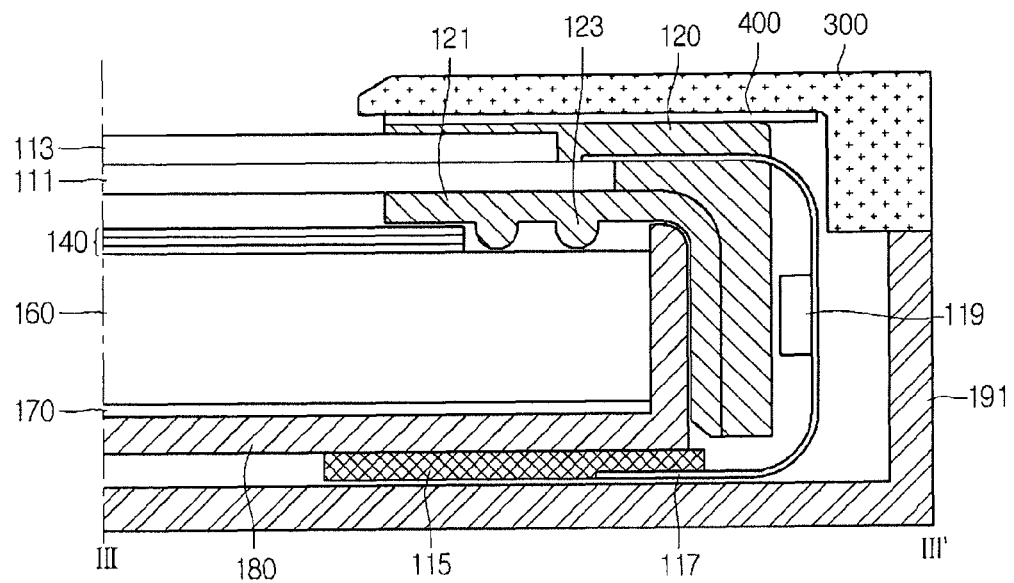
FIG. 7 is a cross-sectional view showing the LCD device taken along a line III-III' in FIG. 6.
Figure 8:
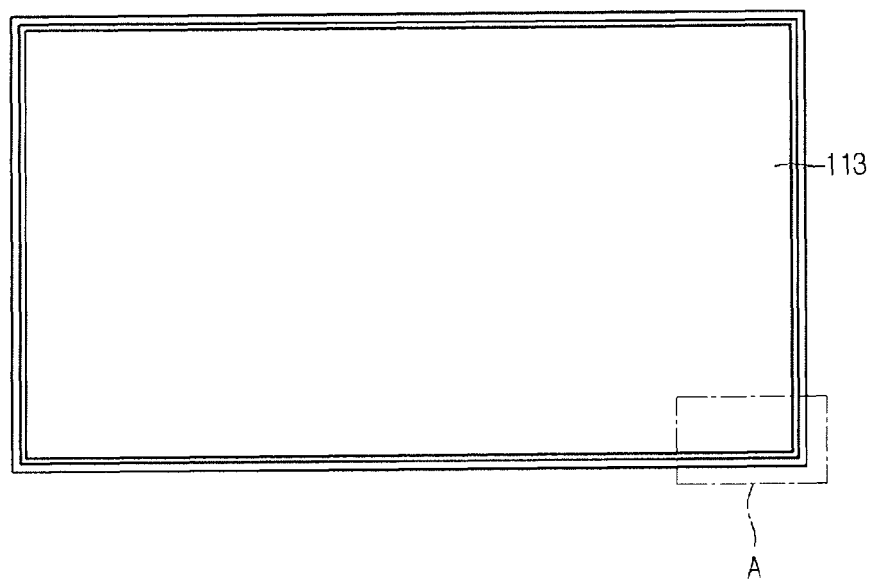
FIG. 8 is a perspective photograph showing the LCD device of FIG. 6.
Figure 9:
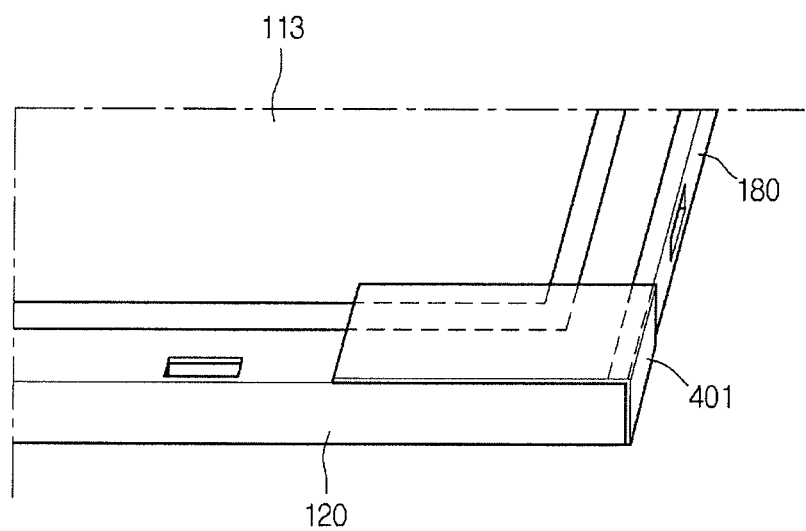
FIG. 9 is a perspective photograph showing in detail a region A in FIG. 8.

FIG. 6 is a disassembled perspective view showing an LCD device according to another embodiment of the present disclosure. FIG. 7 is a cross-sectional view showing the LCD device taken along a line in FIG. 6. FIG. 8 is a perspective photograph showing the LCD device of FIG. 6, and FIG. 9 is a perspective photograph showing in detail a region "A" in FIG. 8.

As shown in FIGS. 6 through 9, the LCD device according to another embodiment of the present disclosure has the same configuration as that according to an embodiment of the present disclosure except for an upper case 300, a shielding film 400 and a clamper 401. As such, the rest of the LCD device according to another embodiment without the upper case 300, shielding film 400 and clamper 401 will be referred to with the same numbers as those according to one embodiment. Moreover, the description of one embodiment to be repeated in another embodiment of the present disclosure will be omitted.

The upper case 300 included in the LCD device according to another embodiment of the present disclosure can be formed from an insulation material. The upper case 300 is configured to encompass edges of the LCD panel 110. The upper case 300 functions to protect the LCD panel 110. Such an upper case can be formed from a plastic material.

Although it is not shown in the drawings, the upper case 300 is combined with a lower case 191. The lower case 191 can be formed from an insulation material.

The LCD device according to another embodiment of the present disclosure further includes the shielding film 400 configured to prevent circuit damage of the driver PCB 115 which can be caused by an inflow of static electricity via the COFs 117. The shielding film 400 also has a function of preventing a damage of the driver IC chip 119 which can be caused by the inflow of static electricity through the COF 117.

The shielding film 400 is attached to one lower surface edge of the upper case 300 opposite to an area in which the driver PCB 115 is installed. In other words, the shielding film 400 is disposed at one upper surface edge 125 of the panel guider 120 opposite to the area in which the driver PCB 115 is installed.

Also, the shielding film 400 can overlap with one upper surface edge 125 of the panel guider 120 and one edge 110a of the LCD panel 110. Actually, the shielding film 400 can contact one upper surface edge 125 of the panel guider 120 and one edge 110a of the LCD panel 110.

Moreover, the shielding film 400 is formed from a conductive material and in a structure having long edges and short edges. The shielding film 400 is attached along one lower surface edge of the upper case 300 without being broken.

In order to be attached to the lower surface of the upper case 300, the shielding film 400 can include a metal film and an adhesive material layer coated on the metal film.

Although it is described that the shielding film 400 is configured with the metal film and attached to the upper case 300 by the adhesive material layer, the LCD device according to another embodiment of the present disclosure is not limited to this. In other words, the LCD device according to another embodiment of the present disclosure can include a conductive material layer directly coated on one lower surface edge of the upper case 300 instead of the metal film coated with the adhesive material layer.

The LCD device according to another embodiment of the present disclosure further includes a connection member 401 positioned at a corner of the panel guider 120 and used for electrically connecting the shielding film 400 with the bottom cover 180 formed from a metal material. The connection member 401 bends along outer surfaces of the panel guider 120 and contacts the bottom cover 180. As such, the connection member 401 is electrically connected to the bottom cover 180. Also, the connection member 401 is in contact with one end of the shielding film 400 and electrically connected to the shielding film 400. In other words, an upper surface (or an upper plate or an upper portion) of the connection member 401 overlaps with one end of the shielding film 400.

Such a shielding film 400 included in the LCD device according to another embodiment of the present disclosure bypasses static electricity from the exterior to the bottom cover 180 through the connection member 401, and enables static electricity to be discharged toward a ground source through the system driver 190 which is positioned at the rear surface of the bottom cover 180. As such, the shielding film 400 can prevent damage to the driver PCB 115 and driver IC chips 119 which can be caused by static electricity from the exterior.

As described above, the LCD device according to another embodiment of the present disclosure can remove the top case included in the ordinary LCD device. Also, the LCD device includes the shielding film attached to or coated on the lower surface of the upper case opposite to the driver PCB 115, and enables static electricity from the exterior to be discharged toward the ground source through the bottom cover 180 and the system driver 190. As such, the LCD device can become thinner by removing the top case and simultaneously prevent possible damage from static electricity. Moreover, manufacturing cost and entire weight of the LCD device can be reduced.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
a liquid crystal display panel;
an upper case formed from an insulation material and configured to encompass edges of the liquid crystal display panel;
a driver PCB (printed circuit board) configured to apply drive signals to one edge of the liquid crystal display panel;
a light source configured to apply light to the liquid crystal display panel;
a panel guider configured to support the liquid crystal display panel;
a bottom cover formed from a metal material and configured to receive the light source; and
a shielding film disposed under one edge of the upper case opposite to the driver PCB and electrically connected to the bottom cover,
wherein the driver PCB is connected to the liquid crystal display panel by means of a plurality of COFs (Chip on films) or TCPs (Tape Carrier Packages),
wherein the shielding film has a structure configured to encompass the outer surfaces of the COFs or TCPs,
wherein the shielding film includes a body portion, a plurality of wings and a connection portion,
wherein the plurality of wings are formed to protrude outwardly from one long edge of the body portion,
wherein the plurality of wings are directly contact with the outer surfaces of the COFs or TCPs,
wherein the connection portion is extended from one end of the body portion and is configured to contact the bottom cover,
wherein the body and connection portions include:
a base layer formed from an insulation material; and
a thin metal layer formed on the base layer,
wherein the panel guider includes a support surface portion configured to support the liquid crystal display panel and a plurality of protrusions formed to protrude from the support surface portion, and
wherein the plurality of protrusions are configured to prevent a movement of a light guide plate.

2. The liquid crystal display device claimed as claim 1, wherein the driver PCB is disposed on a lower surface of the bottom cover.

3. The liquid crystal display device claimed as claim 1, further comprising a driver IC chip mounted to one surface of the COFs or the TCPs.

4. The liquid crystal display device claimed as claim 3, wherein the body portion is extended along one upper surface edge of the upper case and is configured to have long edges and short edges, and
wherein the plurality of wings are protruded from the one long edge of the body portion configured to contact the other surfaces of the COFs or TCPs.

5. The liquid crystal display device claimed as claim 3, wherein the wing includes:
a base layer formed from an insulation material;
a thin metal layer formed on the base layer; and
an adhesive layer formed on a lower surface of the base layer.

6. The liquid crystal display device claimed as claim 5, wherein the adhesive layer contacts the other surface of the COFs or the TCPs.

7. The liquid crystal display device claimed as claim 1, wherein the base layer is thicker than the thin metal layer.

8. The liquid crystal display device claimed as claim 1, wherein the panel guider is configured to support edges of a lower surface of the liquid crystal display panel, wherein the shielding film is disposed on an upper surface edge and an outer side surface of the panel guider.

9. The liquid crystal display device claimed as claim 4, wherein the panel guider is configured to support edges of lower surface edges of the liquid crystal display panel, wherein the connection portion is configured to bend along outer surfaces of the panel guider and contact the bottom cover.

10. The liquid crystal display device claimed as claim 4, wherein the upper case includes a guide portion configured to bring the wing into contact with the other surface of the COFs or the TCPs.

11. The liquid crystal display device claimed as claim 10, wherein the upper case further includes a plurality of support members arranged on an outer surface of the guide portion and configured to reinforce strength of the guide portion.

12. The liquid crystal display device claimed as claim 1, wherein the shielding film includes a conductive material attached to or coated on one lower surface edge of the upper case.

13. The liquid crystal display device claimed as claim 12, wherein the panel guider is configured to support the liquid crystal display panel, wherein the shielding film is disposed on one upper surface edge of the panel guider.

14. The liquid crystal display device claimed as claim 13, further comprising a connection member disposed at a corner of the panel guider and electrically connected to the bottom cover.

15. The liquid crystal display device claimed as claim 14, wherein the connection member is configured to contact one end of the shielding film.

16. The liquid crystal display device claimed as claim 14, wherein the connection member is configured to overlap with one end of the shielding film.

17. The liquid crystal display device claimed as claim 5, wherein the base layer is thicker than the thin metal layer.

* * * * *